United States Patent [19]

Keogh et al.

[11] Patent Number: 5,474,847
[45] Date of Patent: Dec. 12, 1995

[54] TELEPHONE CABLES

[75] Inventors: Michael J. Keogh, Bridgewater; Jeffrey M. Cogen, Flemington; Geoffrey D. Brown, Bridgewater, all of N.J.

[73] Assignee: Union Carbide Chemicals & Plastics Technology Corporation, Danbury, Conn.

[21] Appl. No.: 219,621

[22] Filed: Mar. 29, 1994

[51] Int. Cl.$^6$ .............................. B32B 15/00; H01B 7/00
[52] U.S. Cl. .................... 428/379; 428/378; 428/383; 174/23 C; 174/23 R; 174/110 PM; 174/110 SR; 174/113 R
[58] Field of Search .................... 428/378, 379, 428/383; 174/120 SR, 113 R, 116, 110 SR, 110 PM, 23 C, 23 R

[56] References Cited

U.S. PATENT DOCUMENTS

| | | | |
|---|---|---|---|
| 3,445,391 | 5/1969 | Braid et al. | 252/51.5 |
| 3,660,438 | 5/1972 | Dexter | 260/404.5 |
| 3,682,980 | 8/1972 | Braid et al. | 260/396 R |
| 3,772,722 | 11/1973 | Dexter | 260/45.72 |
| 4,044,200 | 8/1977 | Turbett | 174/23 R |
| 4,065,635 | 12/1977 | Kiss | 174/23 R |
| 4,234,656 | 11/1980 | Amembal et al. | 428/379 |
| 5,189,088 | 2/1993 | Wang et al. | 524/222 |
| 5,380,591 | 1/1995 | Keogh et al. | 428/379 |

Primary Examiner—Patrick J. Ryan
Assistant Examiner—J. M. Gray
Attorney, Agent, or Firm—Saul R. Bresch

[57] ABSTRACT

An article of manufacture comprising, as a first component, a plurality of electrical conductors, each surrounded by one or more layers of a mixture comprising one or more polyolefins and the reaction product of a compound containing a sterically hindered amine or phenol and a quinone compound, and, as a second component, hydrocarbon cable filler grease within the interstices between said surrounded conductors.

5 Claims, No Drawings

TELEPHONE CABLES

TECHNICAL FIELD

This invention relates to wire and cable and the insulation and jacketing therefor and, more particularly, to telephone cable, and to novel antioxidants therefor.

BACKGROUND OF THE INVENTION

A typical telephone cable is constructed of twisted pairs of metal conductors for signal transmission. Each conductor is insulated with a polymeric material. The desired number of transmission pairs is assembled into a circular cable core, which is protected by a cable sheath incorporating metal foil and/or armor in combination with a polymeric jacketing material. The sheathing protects the transmission core against mechanical and, to some extent, environmental damage.

Of particular interest are the grease-filled telephone cables. These cables were developed in order to minimize the risk of water penetration, which can severely upset electrical signal transmission quality. A watertight cable is provided by filling the air spaces in the cable interstices with a hydrocarbon cable filler grease. While the cable filler grease extracts a portion of the antioxidants from the insulation, the watertight cable will not exhibit premature oxidative failure as long as the cable maintains its integrity.

In the cable transmission network, however, junctions of two or more watertight cables are required and this joining is often accomplished in an outdoor enclosure known as a pedestal (an interconnection box). Inside the pedestal, the cable sheathing is removed, the cable filler grease is wiped off, and the transmission wires are interconnected. The pedestal with its now exposed insulated wires is usually subjected to a severe environment, a combination of high temperature, air, and moisture. This environment together with the depletion by extraction of those antioxidants presently used in grease-filled cable can cause the insulation in the pedestal to exhibit premature oxidative failure. In its final stage, this failure is reflected in oxidatively embrittled insulation prone to cracking and flaking together with a loss of electrical transmission performance.

To counter the depletion of antioxidants, it has been proposed to add high levels of antioxidants to the polymeric insulation. However, this not only alters the performance characteristics of the insulation, but is economically unsound in view of the high cost of antioxidants. There is a need, then, for antioxidants which will resist cable filler grease extraction to the extent necessary to prevent premature oxidative failure and ensure the 30 to 40 year service life desired by industry.

DISCLOSURE OF THE INVENTION

An object of this invention, therefore, is to provide a grease-filled cable construction containing a novel antioxidant, which will resist extraction and be maintained in the cable insulation at a satisfactory stabilizing level. Other objects and advantages will become apparent hereinafter.

According to the invention, an article of manufacture has been discovered, which meets the above object, comprising, as a first component, a plurality of electrical conductors, each surrounded by one or more layers comprising a mixture of one or more polyolefins and the reaction product of any one of

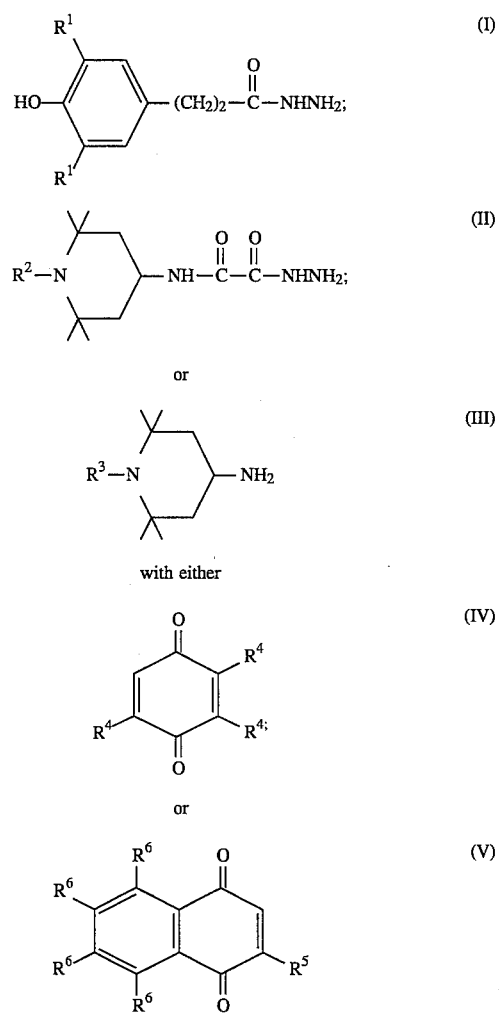

wherein $R^1$, $R^2$, and $R^3$ are each independently hydrogen or alkyl having 1 to 16 carbon atoms and $R^4$, $R^5$, and $R^6$ are each independently hydrogen, alkyl having 1 to 6 carbon atoms, amino, alkyl amino having 1 to 12 carbon atoms, or alkoxy having 1 to 12 carbon atoms, and, as a second component, hydrocarbon cable filler grease within the interstices between said surrounded conductors.

In one other embodiment, the article of manufacture comprises first and second components; however, the mixture of the first component contains absorbed hydrocarbon cable filler grease or one or more of the hydrocarbon constituents thereof and, in another embodiment, the article of manufacture is composed only of the first component wherein the mixture contains hydrocarbon cable filler grease or one or more of the hydrocarbon constituents thereof.

In still another embodiment of this invention are novel stabilizers, which are the reaction products defined above.

DESCRIPTION OF THE PREFERRED EMBODIMENTS

The polyolefins used in this invention are generally thermoplastic resins, which are crosslinkable. They can be homopolymers or copolymers produced from two or more comonomers, or a blend of two or more of these polymers, conventionally used in film, sheet, and tubing, and as jacketing and/or insulating materials in wire and cable applications. The monomers useful in the production of these homopolymers and copolymers can have 2 to 20 carbon atoms, and preferably have 2 to 12 carbon atoms. Examples of these monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third toohomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoroethylene, and chlorotrifluoroethylene; and acrylic acid, methacrylic acid, and other similar unsaturated acids.

The homopolymers and copolymers referred to can be nonhalogenated, or halogenated in a conventional manner, generally with chlorine or bromine. Examples of halogenated polymers are polyvinyl chloride, polyvinylidene chloride, and polytetrafluoroethylene. The homopolymers and copolymers of ethylene and propylene are preferred, both in the non-halogenated and halogenated form. Included in this preferred group are terpolymers such as ethylene/propylene/diene monomer rubbers.

Other examples of ethylene polymers are as follows: a high pressure homopolymer of ethylene; a copolymer of ethylene and one or more alpha-olefins having 3 to 12 carbon atoms; a homopolymer or copolymer of ethylene having a hydrolyzable silane grafted to their backbones; a copolymer of ethylene and a hydrolyzable silane; or a copolymer of an alpha-olefin having 2 to 12 carbon atoms and an unsaturated ester having 4 to 20 carbon atoms, e.g., an ethylene/ethyl acrylate or vinyl acetate copolymer; an ethylene/ethyl acrylate or vinyl acetate/hydrolyzable silane terpolymer; and ethylene/ethyl acrylate or vinyl acetate copolymers having a hydrolyzable silane grafted to their backbones.

With respect to polypropylene: homopolymers and copolymers of propylene and one or more other alpha-olefins wherein the portion of the copolymer based on propylene is at least about 60 percent by weight based on the weight of the copolymer can be used to provide the polyolefin of the invention. The polypropylene can be prepared by conventional processes such as the process described in U.S. Pat. No. 4,414,132. The alpha-olefins in the copolymer are preferably those having 2 or 4 to 12 carbon atoms.

The homopolymer or copolymers can be crosslinked or cured with an organic peroxide, or to make them hydrolyzable, they can be grafted with an alkenyl trialkoxy silane in the presence of an organic peroxide which acts as a free radical generator or catalyst. Useful alkenyl trialkoxy silanes include the vinyl trialkoxy silanes such as vinyl trimethoxy silane, vinyl triethoxy silane, and vinyl triisopropoxy silane. The alkenyl and alkoxy radicals can have 1 to 30 carbon atoms and preferably have 1 to 12 carbon atoms.

The homopolymers or copolymers of ethylene wherein ethylene is the primary comonomer and the homopolymers and copolymers of propylene wherein propylene is the primary comonomer may be referred to herein as polyethylene and polypropylene, respectively.

Hydrolyzable polymers can be cured with moisture in the presence of a conventional silanol condensation catalyst such as dibutyltin dilaurate, dioctyl tin maleate, stannous acetate, and stannous octoate.

The polyethylenes can have a density in the range of about 0.850 to about 0.970 gram per cubic centimeter. The density is preferably in the range of about 0.926 to about 0.970 gram per cubic centimeter. Medium and high density polyethylenes are preferred.

Hydrocarbon cable filler grease is a mixture of hydrocarbon compounds, which is semisolid at use temperatures. It is known industrially as "cable filling compound". A typical requirement of cable filling compounds is that the grease has minimal leakage from the cut end of a cable at a 60° C. or higher temperature rating. Another typical requirement is that the grease resist water leakage through a short length of cut cable when water pressure is applied at one end. Among other typical requirements are cost competitiveness; minimal detrimental effect on signal transmission; minimal detrimental effect on the physical characteristics of the polymeric insulation and cable sheathing materials; thermal and oxidative stability; and cable fabrication processability.

Cable fabrication can be accomplished by heating the cable filling compound to a temperature of approximately 100° C. This liquefies the filling compound so that it can be pumped into the multiconductor cable core to fully impregnate the interstices and eliminate all air space. Alternatively, thixotropic cable filling compounds using shear induced flow can be processed at reduced temperatures in the same manner. A cross section of a typical finished grease-filled cable transmission core is made up of about 52 percent insulated wire and about 48 percent interstices in terms of the areas of the total cross section. Since the interstices are completely filled with cable filling compound, a filled cable core typically contains about 48 percent by volume of cable filler.

The cable filling compound or one or more of its hydrocarbon constituents enter the insulation through absorption from the interstices. Generally, the insulation absorbs about 3 to about 30 parts by weight of cable filling compound or one or more of its hydrocarbon constituents, in toto, based on 100 parts by weight of polyolefin. A typical absorption is in the range of a total of about 5 to about 25 parts by weight per 100 parts by weight of polyolefin.

It will be appreciated by those skilled in the art that the combination of resin, cable filling compound constituents, and antioxidants in the insulation is more difficult to stabilize than an insulating layer containing only resin and antioxidant, and no cable filling compound constituent.

Examples of hydrocarbon cable filler greases are petrolatum; petrolatum/polyolefin wax mixtures; oil modified thermoplastic rubber (ETPR or extended thermoplastic rubber); paraffin oil; naphthenic oil; mineral oil; the aforementioned oils thickened with a residual oil, petrolatum, or wax; polyethylene wax; mineral oil/rubber block copolymer mixture; lubricating grease; and various mixtures thereof, all of which meet industrial requirements similar to those typified above.

Generally, cable filling compounds extract insulation antioxidants and, as noted above, are absorbed into the polymeric insulation. Since each cable filling compound contains several hydrocarbons, both the absorption and the extraction behavior are preferential toward the lower molecular weight hydrocarbon wax and oil constituents. It is found that the insulation composition with its antioxidant not only has to resist extraction, but has to provide sufficient stabilization (i) to mediate against the copper conductor, which is a potential catalyst for insulation oxidative degradation, (ii) to counter the effect of residuals of chemical blowing agents present in cellular and cellular/solid (foam/skin) polymeric foamed insulation; and (iii) to counter the effect of absorbed constituents from the cable filling compound.

The antioxidant of the invention is similar to the other antioxidants used in polyolefin compositions in that it contains either a sterically hindered amine or a sterically hindered phenol. More particularly, the antioxidant is the reaction product of

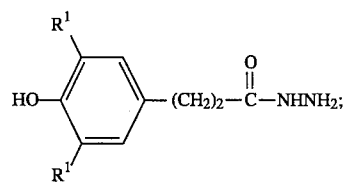
(I)

(II)

(III)

with either (IV)

or (V)

wherein $R^1$, $R^2$, and $R^3$ are each independently hydrogen or alkyl having 1 to 16 carbon atoms and $R^4$, $R^5$, and $R^6$ are each independently hydrogen, alkyl having 1 to 6 carbon atoms, amino, alkyl amino having 1 to 12 carbon atoms, or alkoxy having 1 to 12 carbon atoms.

Examples of each of the above compounds are as follows:

(I)

(II)

(III)

(IV)

(V)

-continued

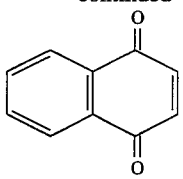

The reaction of the above compounds is typically effected in molten polymer such as those mentioned above or in an organic solvent such as ethanol, methanol, N,N-dimethylformamide, and dimethyl sulfoxide provided that the polymer or solvent are inert insofar as the reaction is concerned. The compounds can be reacted in any proportions; however, the weight ratio of the reactant is preferably in the range of about 0.1 to about 10 parts by weight of the compound containing the hindered amine or hindered phenol to 1 part by weight of the quinone compound. The reaction temperature in the solvent is, generally, in the range of about 25 to about 100° C., and the residence time in the reaction medium is, generally, in the range of about 3 minutes to about 8 hours. Preferred reactants and conditions appear in the examples.

It is found that these antioxidants substantially resist the effects of extraction by grease as opposed to other hindered amines and phenols in particular, and other antioxidants in general. The amount of these antioxidants typically used in the polyolefin is in the range of about 0.05 to about 0.5 parts by weight based on 100 parts by weight of polyolefin. The novel antioxidants can be used in combination with disulfides, phosphites, hindered phenols, and hindered amines, as well as other conventional primary and secondary antioxidants in ratios of about 10:1 to about 1:10 for additional oxidative and thermal stability, but, of course, it must be determined to what extent these latter compounds are extracted by the grease since this could affect the efficacy of the combination in grease filled cable. These antioxidants can also be used in conventional applications as primary or secondary antioxidants or as metal deactivators. They are particularly effective in the presence of copper, which is known to catalyze the oxidative degradation of polyethylene.

The following conventional additives can be added in conventional amounts if desired: ultraviolet absorbers, antistatic agents, pigments, dyes, fillers, slip agents, fire retardants, stabilizers, crosslinking agents, halogen scavengers, smoke inhibitors, crosslinking boosters, processing aids, e.g., metal carboxylates, lubricants, plasticizers, viscosity control agents, and foaming or blowing agents such as azodicarbonamide. The fillers can include, among others, magnesium hydroxide and alumina trihydrate. As noted, other antioxidants and/or metal deactivators can also be used, but for these or any of the other additives, resistance to grease extraction must be considered. 1,2-bis(3,5-di-tert-butyl-4-hydroxy-hydrocinnamoyl) hydrazine added as an adjunct metal deactivator and antioxidant is desirable.

Additional information concerning grease-filled cable can be found in Eoll, The Aging of Filled Cable with Cellular Insulation, International Wire & Cable Symposium Proceeding 1978, pages 156 to 170, and Mitchell et al, Development, Characterization, and Performance of an Improved Cable Filling Compound, International Wire & Cable Symposium Proceeding 1980, pages 15 to 25. The latter publication shows a typical cable construction on page 16 and gives additional examples of cable filling compounds.

The patents and publications mentioned in this specification are incorporated by reference herein.

The invention is illustrated by the following examples.

Example 1

In this example, quinone is reacted with a hydrazide containing a sterically hindered phenol represented by formula I set forth above wherein $R^1$ is a tertiary butyl radical. The reaction is carried out in situ in molten polyethylene. The polyethylene is a high density polyethylene (HDPE) having a density of 0.945 gram per cubic centimeter and a melt index of 0.75 gram per 10 minutes; it is a copolymer of ethylene and 1-hexene. This same HDPE will be used in examples 2, 3, and 7 to 17.

In a BRABENDER™ mixer, 40 grams of HDPE is fluxed at 150° C. To the flux is added 0.38 gram of quinone (also known as p-benzoquinone or 1,4-benzoquinone) followed by 1.38 grams of the formula I compound. Mixing is continued for an additional 5 minutes in the range of 150 to 180° C. to provide an HDPE masterbatch containing the novel antioxidant having a characteristic brown color. The masterbatch is referred to below as component A.

Example 2

In this example, quirtone is reacted with a hydrazide containing a sterically hindered amine represented by formula II set forth above wherein $R^2$ is a hydrogen atom. The conditions of example I are repeated except that 0.44 gram of quinone and 1.32 grams of the formula II compound are used. The product is an HDPE masterbatch containing the novel antioxidant having a characteristic brown color. The masterbatch is referred to below as component B.

Example 3

In this example, quinone is reacted with a sterically hindered amine represented by formula III set forth above wherein $R^3$ is a hydrogen atom. The conditions of example 1 are repeated except that 0.90 gram of quinone and 1.20 grams of the formula III compound are used. The product is an HDPE masterbatch containing the novel antioxidant having a characteristic brown color. The masterbatch is referred to below as component C.

Example 4

In this example, quinone is reacted, in an organic solvent, with a hydrazide containing a sterically hindered phenol represented by formula I set forth above wherein $R^1$ is a tertiary butyl radical.

To a solution of 6.4 grams of the formula I compound used in example 1 in 50 milliliters of ethanol at 50° C. is added 3.6 grams of quinone over a period of 5 minutes by which time the originally colorless solution becomes brown. The mixture is then stirred at reflux for 4.5 hours and then cooled to room temperature. The solvent is evaporated and the resulting residue is washed with copious amounts of warm water until the wash water is colorless. The residue is then dried under vacuum at 70° C. yielding 5.2 grams of brown solid with a softening point of 80° C. and a melting range of 125 to 135° C. The product is soluble in ethyl acetate, ethanol, acetone, and N,N-dimethylformamide. The product is referred to below as component D.

Example 5

In this example, quinone is reacted, in an organic solvent, with a hydrazide containing a sterically hindered amine represented by formula II set forth above wherein $R^2$ is a hydrogen atom.

To a solution of 5.3 grams of the formula II compound used in example 2 in 65 milliliters of ethanol at 50° C. is added 3.6 grams of quinone over a period of 5 minutes by which time the solution becomes brown and a considerable amount of brown precipitate is formed. The mixture is then stirred at reflux for 2 hours and then cooled to room temperature. The solid product is collected by filtration and washed with 25 milliliters of ethanol. Residual solvent is removed under vacuum at 90° C. yielding 4.0 grams of brown solid with a softening point of 235° C. The product is insoluble in ethyl acetate, ethanol, and acetone, and is sparingly soluble in N,N-dimethylformamide. The product is referred to below as component E.

Example 6

In this example, quinone is reacted, in an organic solvent, with a sterically hindered amine represented by formula III set forth above wherein $R^3$ is a hydrogen atom.

To a solution of 3.4 grams of the formula III compound used in example 3 in 25 milliliters of ethanol at 50° C. is added a slurry of 3.6 grams of quinone in 35 milliliters of ethanol over a period of 30 minutes by which time the solution becomes brown and a considerable amount of red precipitate is formed. The mixture is then stirred at reflux for 4 hours and then cooled to room temperature. The red solid is collected by filtration and washed with 60 milliliters of ethanol. Residual solvent is removed under vacuum at 70° C. yielding 4.7 grams of red solid with a melting range of 255 to 260° C. The product is insoluble in ethyl acetate, ethanol, and acetone, and is sparingly soluble in N,N-dimethylformamide. The product is referred to below as component F.

Examples 7 to 17

A laboratory procedure simulating the grease filled cable application is used to demonstrate performance. Polyethylene samples incorporating specified antioxidants are prepared using standard melt mixing techniques. The polyethylene is a copolymer of ethylene and 1-hexene. The density of the copolymer is 0.945 gram per cubic centimeter and the melt index is 0.75 gram per 10 minutes. There is a final melt mixing on a laboratory Brabender™ type mixer followed by preparation of the test plaques (approximately 0.010 inch thick) using a compression molding press at 150° C. with ASTM D-1928 as a guideline. Initial oxygen induction time (OIT) is measured on these test plaques.

A supply of hydrocarbon cable filler grease is heated to about 80° C. and well mixed to ensure uniformity. A supply of 30 milliliter dram vials are then each filled to approximately 25 milliliters with the cable filler grease. These vials are then cooled to room temperature for subsequent use. An oil extended thermoplastic rubber (ETPR) type cable filler grease is the hydrocarbon cable filler grease used in these examples. It is a typical cable filling compound.

Each ten mil test plaque is then cut to provide about twenty approximately one-half inch square test specimens. Before testing, each vial is reheated to about 70° C. to allow for the easy insertion of the test specimens. The specimens are inserted into the vial one at a time together with careful wetting of all surfaces with the cable filler grease. After all of the specimens have been inserted, the vials are loosely capped and placed in a 70° C. circulating air oven. Specimens are removed at 1, 2, and 4 week intervals in examples 7 to 13. The specimens are wiped clean with dry tissue for oxidation induction time (OIT) testing. In examples 14 to 17, OITs are performed on copper pans to demonstrate effectiveness in inhibiting copper (no grease is used).

OIT testing is accomplished in a differential scanning calorimeter with an OIT test cell. The test conditions for examples 7 to 13 are: uncrimped aluminum pan; no screen; heat up to 200° C. under nitrogen, followed by a switch to a 50 milliliter flow of oxygen. The test conditions for example 14 to 17 are: uncrimped copper pan; no screen; heat up to 210° C. under nitrogen, followed by a switch to a 50 milliliter flow of oxygen. Oxidation induction time (OIT) is the time interval between the start of oxygen flow and the exothermic decomposition of the test specimen. OIT is reported in minutes; the greater the number of minutes, the better the OIT. OIT is used as a measure of the oxidative stability of a sample as it proceeds through the cable filler grease exposure and the oxidative aging program. Relative performance in the grease filled cable applications can be predicted by comparing initial sample OIT to OIT values after 70° C. cable filler grease exposure.

Component X is an antioxidant conventionally used in grease filled cable, i.e., 1,2-bis(3,5-di-tert-butyl-4-hydroxyhydrocinnamoyl)hydrazine. The only components of the formulations are polyethylene and the antioxidant(s). Components A, B, C, D, E, and F are described in examples 1 to 6, respectively.

The OIT results are also given in the Table.

The experimental results summarized in the Table show the improved performance with antioxidants prepared in examples 1 to 6 versus conventional antioxidant X alone after the exposure to 70° C. cable filler grease. The laboratory results are expected to correspond to improved performance in the commercial grease filled cable application.

TABLE

| Example | 7 | 8 | 9 | 10 | 11 | 12 | 13 | 14 | 15 | 16 | 17 |
|---|---|---|---|---|---|---|---|---|---|---|---|
| Component | | | | | | | | | | | |
| HDPE | 99.50 | 96.77 | 96.77 | 96.77 | 99.40 | 99.40 | 99.40 | 99.50 | 99.40 | 99.40 | 99.40 |
| X | 0.50 | 0.50 | 0.50 | 0.50 | 0.50 | 0.50 | 0.50 | 0.50 | 0.50 | 0.50 | 0.50 |
| A | — | 2.73 | — | — | — | — | — | — | — | — | — |
| B | — | — | 2.73 | — | — | — | — | — | — | — | — |
| C | — | — | — | 2.73 | — | — | — | — | — | — | — |
| D | — | — | — | — | 0.10 | — | — | — | 0.10 | — | — |
| E | — | — | — | — | — | 0.10 | — | — | — | 0.10 | — |
| F | — | — | — | — | — | — | 0.10 | — | — | — | 0.10 |
| OIT | | | | | | | | | | | |
| INITIAL | 167 | 198 | 201 | 215 | 219 | 171 | 246 | 55 | 75 | 59 | 78 |
| 1 WEEK | 128 | 165 | 204 | 211 | 181 | 154 | 215 | — | — | — | — |
| 2 WEEKS | 117 | 152 | 195 | 208 | 161 | 137 | 234 | — | — | — | — |
| 4 WEEKS | 116 | 163 | 201 | 201 | 162 | 141 | 208 | — | — | — | — |

We claim:

1. A cable construction adapted for underground use comprising the following components:

(i) a plurality of insulated electrical conductors having interstices therebetween, said insulation comprising (a) one or more polyolefins and, blended therewith, (b) the reaction product of any one of

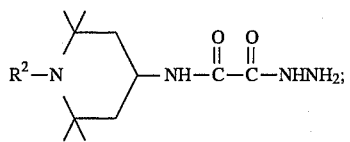

(II)

or

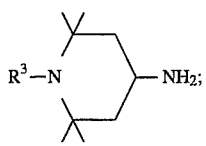

(III)

with either

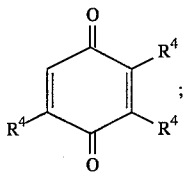

(IV)

or

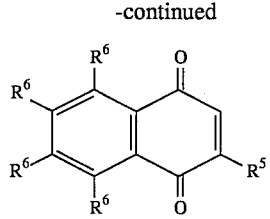

(V)

wherein $R^1$, $R^2$, and $R^3$ are each independently hydrogen or alkyl having 1 to 16 carbon atoms and $R^4$, $R^5$, and $R^6$ are each independently hydrogen, alkyl having 1 to 6 carbon atoms, amino, alkyl amino having 1 to 12 carbon atoms, or alkoxy having 1 to 12 carbon atoms;

(ii) hydrocarbon cable filler grease within the interstices; and (iii) a sheath surrounding components (i) and (ii).

2. The cable construction defined in claim 1 wherein the reaction product is the reaction product of the formula III compound and the formula IV compound.

3. The cable construction defined in claim 1 wherein, for each 100 parts by weight of said polyolefins, there are about 0.05 to about 0.5 part by weight of said reaction product.

4. The cable construction defined in claim 1 wherein said polyolefins are polyethylene or polypropylene or mixtures thereof.

5. The cable construction defined in claim 1 wherein 1,2-bis(3,5-di-tert-butyl-4-hydroxy-hydrocinnamoyl)hydrazine is included in the mixture.

* * * * *